United States Patent [19]
Thomson

[11] Patent Number: 5,415,085
[45] Date of Patent: May 16, 1995

[54] APPARATUS FOR SHELLING AND SEPARATING ANY TYPE OF NUT OR LEGUME

[76] Inventor: Kirk Thomson, P.O. Box 562, Cairo, Ga. 31729

[21] Appl. No.: 299,359

[22] Filed: Sep. 1, 1994

[51] Int. Cl.⁶ ............................ A23N 5/00; B02B 3/04
[52] U.S. Cl. ........................................ 99/574; 99/579; 99/580; 99/609; 99/617; 99/618
[58] Field of Search .......... 99/568, 571, 572, 574–576, 99/579–582, 600–604, 609–611, 617–622, 623, 625, 628; 30/120.1–120.5; 241/198 A, 242

[56] References Cited
U.S. PATENT DOCUMENTS 2,220,320  11/1940  Dragon .
4,515,076  5/1985  Reznik ............................... 99/571

Primary Examiner—Timothy F. Simone
Attorney, Agent, or Firm—Carnes, Cona, Dixon

[57] ABSTRACT

This invention provides for an apparatus that will shell and separate the shells from the meat of a cracked nut or legume. The apparatus of the present invention is also provided with an adjustable slide plate that will render the apparatus with the capacity of dehulling any variety nut or legume.

10 Claims, 4 Drawing Sheets

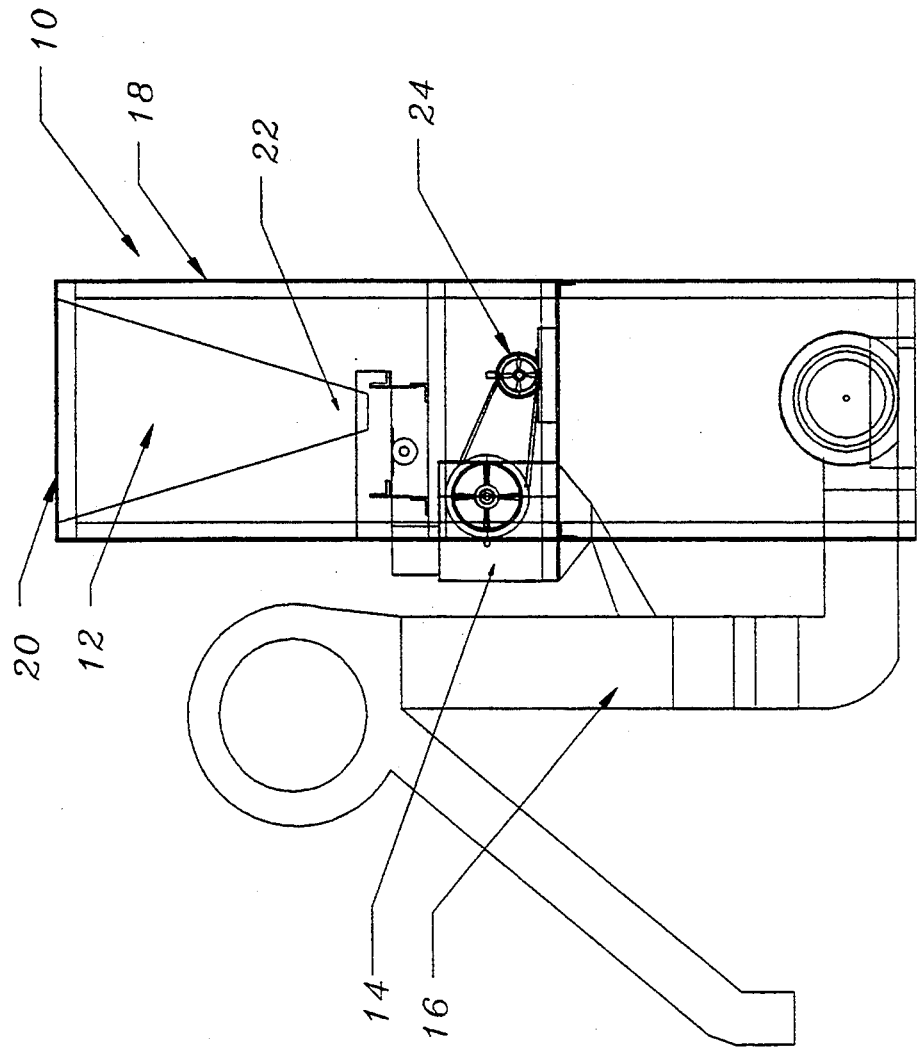

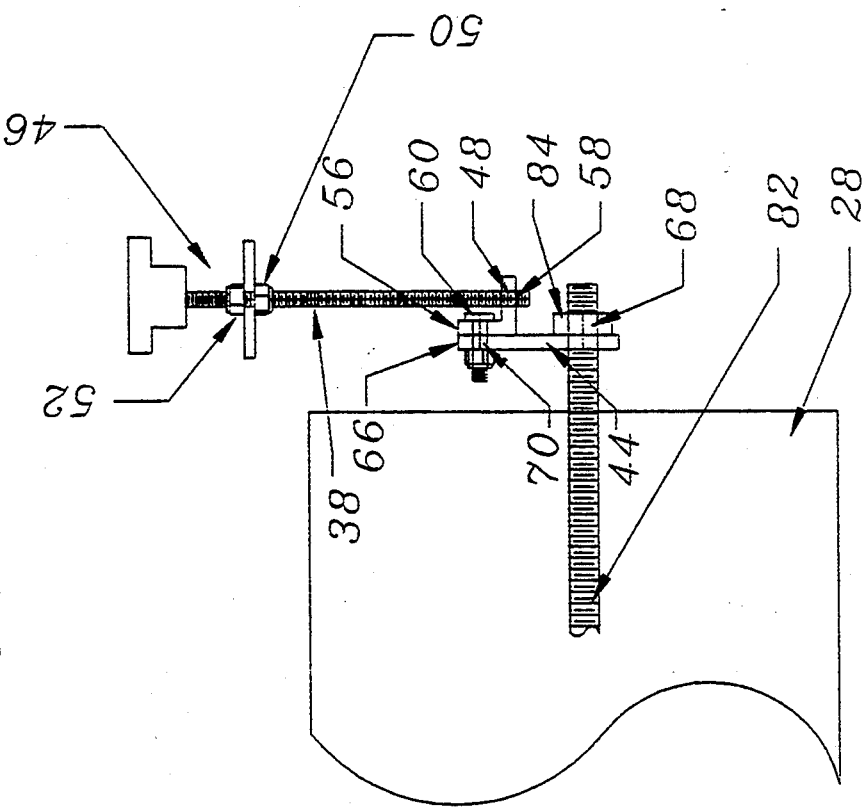
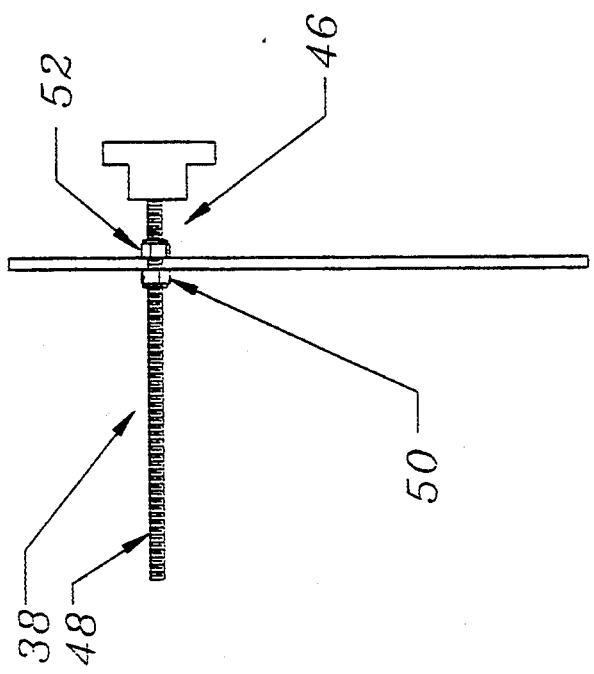

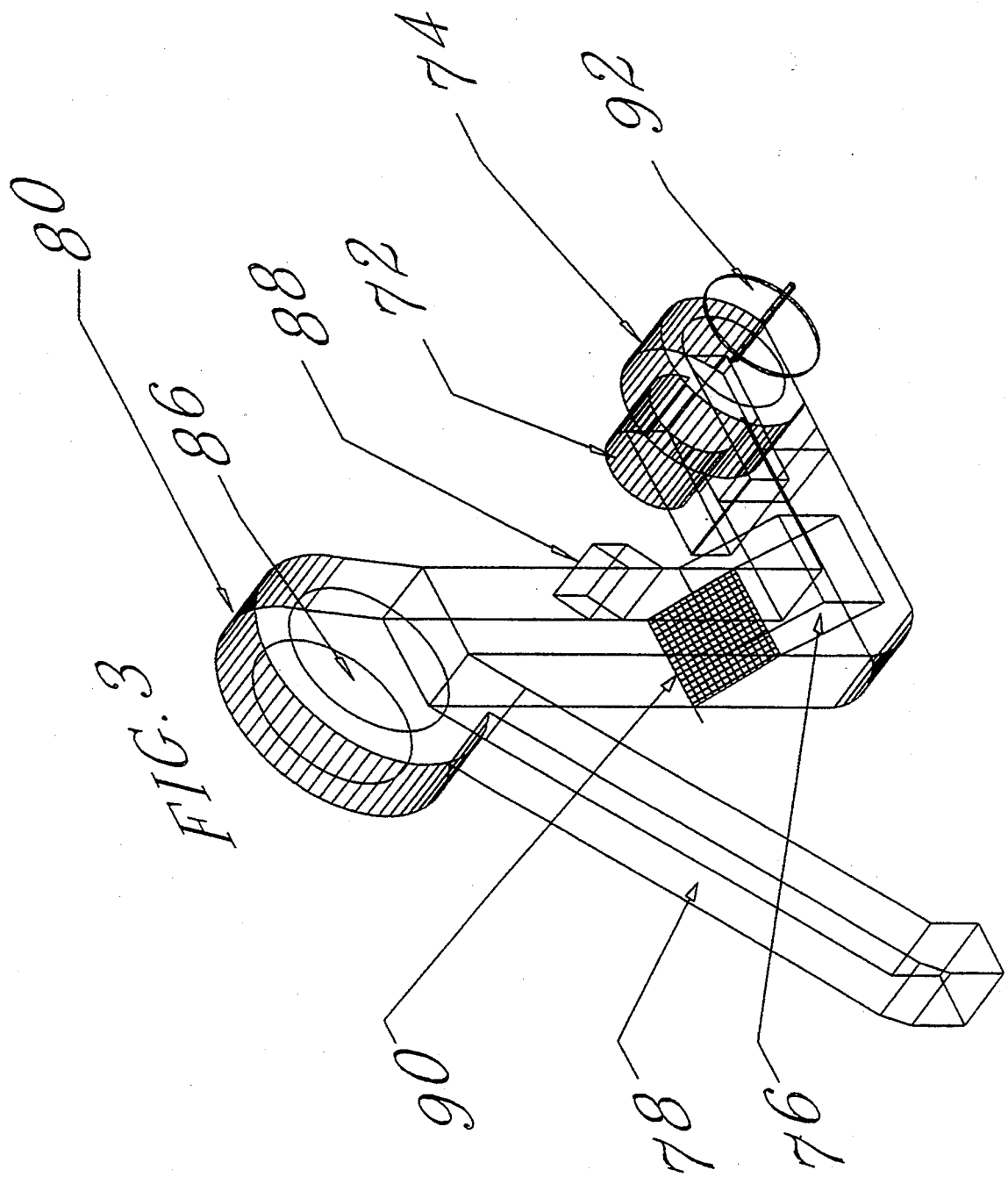

APPARATUS FOR SHELLING AND SEPARATING ANY TYPE OF NUT OR LEGUME

BACKGROUND OF THE INVENTION

1. Field of the Invention

The present invention relates generally to nut or legume shelling and separating device and more particularly to a nut or legume shelling and separating device having an adjusting means in order to accommodate any type nut or legume.

2. Description of the Prior Art

It has long been recognized that there is a multiplicity of devices that will shell a nut or legume. Some devices even include a means of separating the meat from the shell of the nut. Such an apparatus is disclosed in, for example, U.S. Pat. No. 2,220,320 issued to Dragon. The shelling for the nuts in the Dragon patent consists of a drum, which is located in a hollow casing. The nut passes through the gap between the drum and hollow casing to permit for pressure to be applied to the nut. This gap can be altered. An inner drum and an outer drum aid in the separation of the meat from the shell of the nut. Each drum includes a plurality of apertures, wherein the diameters of the apertures of the outer drum is larger than the diameters of the apertures of the inner drum. This is to provide for the shells and meat of the nut to be shifted through the drums.

A problem with Dragons apparatus is that though the gap may be adjusted, the apertures in the drum may not be adjusted. This limits the nuts which can be shelled and separated. A second problem with Dragons apparatus is that by using a pressure roller to crack the nuts, the meat of the nut may be harmed, crushed, and broken prior to the separation process.

A second apparatus is disclosed in, for example, U.S. Pat. No. 4,515,076 issued to Reznik. This apparatus discloses a shelling and separating apparatus which utilizes air to propel the nuts for shelling and separating. The apparatus consists a tube which is located between an air blower and a chamber. In this apparatus, the nut travels through the tube to the impact chamber via air. The nuts come into contact with an impact means which is located inside the chamber. Once the shells are separated from the meat of the nut, the lighter shells are directed to the a second chamber, while the meat, will slide to a third chamber.

A problem with Rezniks apparatus is that the size nut is limited to the size of tube that is used. If the tube were to be alter, the apparatus would have to be disassemble. This causes for the alteration to be tedious and frustrating. A second problem with the apparatus disclosed by Reznik resides in that the nuts are signally transferred to the chamber. This provides for shelling and separating apparatus to be extremely time consuming.

What is needed is a shelling and separating apparatus that will efficiently shell and separate any size nut or legume.

SUMMARY OF THE INVENTION

This invention provides for an apparatus which will automatically shell any size nut or legume. Additionally, the apparatus of the present invention will also automatically separates the meat or seed of the nut or legume from its respective shell.

The apparatus of the present invention consists of a hopper, a shelling area, and a separating area. Upon activation of the machine, cracked nuts or legumes are deposited into the hopper. From the hopper the nuts or legumes are routed into the shelling area.

The shelling area of the apparatus consists of a dehulling plate, a roller, and an adjustable slide plate. The roller on the apparatus forces the cracked nuts or legumes into the dehulling plate in order to permit the meat to separate from the nut. The adjustable slide plate provides the adequate distance between the roller and the slide plate in order for shells and the meat or seed from the nuts or legumes to pass. This adjustable slide plate can be altered to increase or decrease the gap between the roller and slide plate so that any type nut or legume can be husked.

Once the shells and meat from the nuts or legumes are detached, they are then routed to the separating area. In this area, an air blower provides for the shells or pieces of shells to be carried by the air flow to a spout for the shells, while the meat from the nuts or legumes dropped directly downward to a spout for the meat from the nut or legume. The separating area also acts a cleaning station in that the air flow also carries and removes bits of shell and other undesirable by-products from the meat of the nut or legume.

Therefore, it is an object of the present invention to provide for an apparatus that can dehulled any type of nut or legume.

It is another object of the present invention to provide for an apparatus that will efficiently shell and separate the shell or shell pieces from the whole seeds of the nuts or legumes.

It is another object of the present invention to provide for an apparatus which will remove the meat from their shells without bruising or otherwise damaging the meat.

It is another object of the present invention to provide for an apparatus that is proficient and durable in operation.

These and other objects of the invention, as well as many of the attendant advantages thereof, will become more readily apparent when reference is made to the following description, taken into conjunction with the accompanying drawings.

BRIEF DESCRIPTION OF THE DRAWINGS

FIG. 1 is a side view of the shelling and separating apparatus of the present invention.

FIG. 2b is a bottom view of the adjustment means attached to the slide plate of the apparatus of the present invention.

FIG. 2c is a side view of knob used in the adjustment means of the apparatus of the present invention.

FIG. 3 is a perspective view of the separating area of the present invention.

Similar reference numerals refer to similar parts throughout the several views of the drawings.

DESCRIPTION OF THE PREFERRED EMBODIMENTS

Figure 2A:
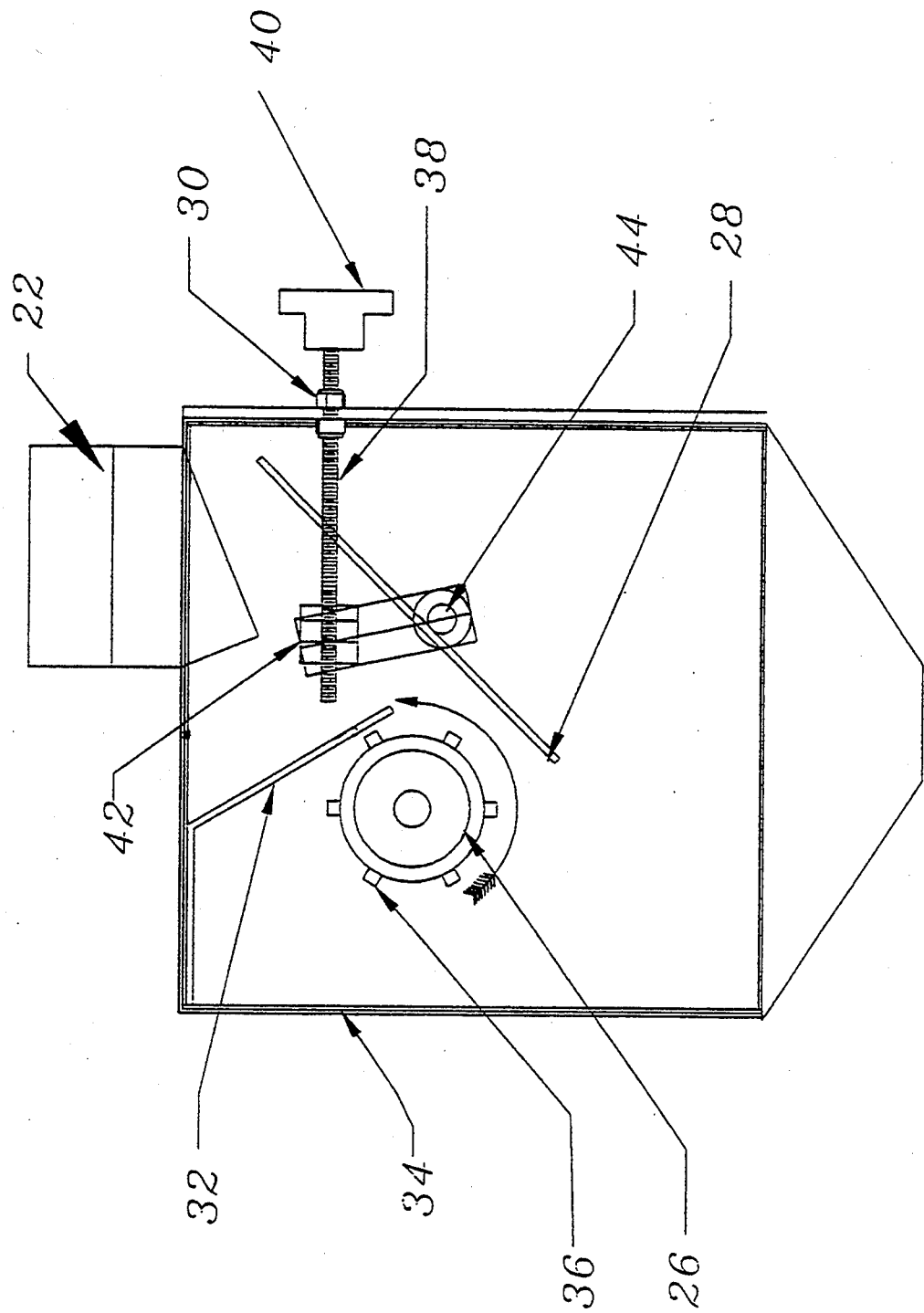
FIG. 2a is a detail side view of the shelling area in the apparatus of the present invention.

As illustrated in FIG. 1, the shell and separator apparatus 10 of the present invention consists of a hopper 12, a shelling area 14, and a separating area 16, which are all maintained and secured to a support frame 18.

The hopper 12 consists of an enlarge open top 20 for receiving the nuts or legumes and progressively decreases in width or diameter to form a spout 22. This spout has an open bottom for feeding the nuts or legumes into the shelling area 14. To provide for a steady flow of the nuts or legumes to the shelling area, a first motor (not illustrated) having a weight attached thereto, is secured to the hopper 12. This first motor, having a weight attached thereto, will provide for the hopper to vibrate, which causes the nuts or legumes within the hopper to be sifted into the shelling area. The nuts (i.e. walnuts, pecans, hazelnuts, etc.) that are placed in the hopper are previously cracked, while the legumes (i.e. peas and beans) are inserted directly into the hopper.

The shelling area, illustrated in FIGS. 2a–2c, consists of a roller 26, an adjustable slide plate 28, an adjustment means 30, and a dehulling plate 32 which are all maintained within a housing 34. The cracked nuts or legumes enter the shelling area 14 via the spout 22 of the hopper.

The dehulling plate 32 is attached to the top of the housing and is located near the front of the roller. Further, the dehulling plate extends across the entire length of the housing. The cracked nuts or legumes are thrown against the blunt edge of this plate in order to aid in the husking of the nuts or legumes. Additionally, this plate prevents nuts or legumes and shells from traveling over the roller during the dehulling process.

The roller 26 extends across the entire length of the housing and is tangent to the dehulling plate. The roller 26 also includes a plurality of evenly spaced bars 36. A second motor 24 is attached to the outside of the housing in the proximity of the roller (this motor is illustrated in FIG. 1). A pulley drive belt is attached to the motor and to the roller (the motor and pulley drive belt are not illustrated in FIGS. 2a–2c). Power is then transferred from the motor to the roller by the pulley, thereby causing the roller to rotate.

Once the roller is rotating, the bars force the cracked nuts or legumes up against the dehulling plate. This process is continued until the meat is completely free from the shell, thereby providing that the meat and shell pieces are able to slide freely under the bars of the roller and into the separating area. The roller normally travels at a rate of approximately 700–750 revolutions per minute (RPM). It is noted, however, that this speed can be increased or decreased in order to provide for the proper speed for permitting the bars of the roller to force the cracked nuts or legumes against the dehulling plate.

The adjustable slide plate 28 is parallel to the roller and extends across the entire length of the housing. The distance between the roller and the adjustable slide plate can be altered by the adjustment means. This adjustment means provides for the plate to move towards or away from the roller in order to accommodate the variety of nuts (i.e. pecans, hazelnuts, walnuts, peanuts, etc.) or legumes (i.e. peas or beans) which are to be shelled. For example, if walnuts were to be dehulled, then the gap between the slide plate and roller would be relatively larger than if peas were to be husked.

The adjustment means 30 is centrally attached to the adjustable slide plate 28. This adjustment means 30 consists of an elongated threaded rod 38, knob 40, L-shaped bracket 42, and securing plate 44.

The elongated thread rod 38, which extends through the housing 34 by way of a threaded opening in the housing, has a first end 46 and a second end 48. The first end, located outside the housing, maintains the knob 40. The second end, located inside the housing, maintains the L-shape bracket. A first lock nut 50 located on the inside of the housing and a second lock nut 52 located on the outside of the housing retains the first end from extending into the housing. The first and second lock nut also provides for the handle to be at a desired distance from the housing.

The L-shape bracket 42 includes a first wall (not labeled) and a second wall 56. Centrally located in the first wall is a first aperture 58. This first aperture 58 is threaded and receives the second end of the elongated threaded rod. Centrally located in the second wall is a second aperture 60.

The securing plate 44 has a first end 66 and a second end 68. The first end includes a first opening 70 and the second end includes a second opening. This first end 66 of the securing plate 44 is attached to the second wall the L-shape bracket 42 via the second aperture 60 of the L-shape bracket and first opening 70 of the securing plate by the use of a nut and bolt. The adjustable slide plate 28 is attached to the second end of the securing plate 44.

The adjustable slide plate 28 includes a top and a bottom. The top of the adjustable slide plate faces the roller and is in direct contact with the nuts during the dehulling process. A second elongated threaded rod 82 is centrally attached to the bottom of the adjustable slide plate 28. This second elongated rod includes a first end and a second end. The first end of the second elongated rod extends through the second opening of the second end of the securing plate and is maintained in place by a set collar 84.

It is noted that the securing plate 44 is secured to the L-shape bracket 42 such that the first end of the securing plate is affixed to the second wall of the L-shape to provide for the second end of the securing plate to extend downwardly from the L-shape bracket. This configuration is illustrated in FIG. 2a. FIG. 2b does not depict this configuration and is merely drawn to illustrate the arrangement of the second rod with respect to the securing plate. In actuality, the first and second ends of configuration is illustrated in FIG. 2a. FIG. 2b does not depict this configuration and is merely drawn to illustrate the arrangement of the second rod with respect to the securing plate. In actuality, the first and second ends of the securing plate would not be parallel to the second wall, but rather, the second end would extend downwardly, as illustrated in FIG. 2a, from the second wall of the L-shape bracket.

By rotating the knob clockwise, the L-shape bracket, securing plate, and adjustable slide plate are shifted toward the roller. This causes the gap between the adjustable slide plate and roller to decrease in size. By rotating the knob counterclockwise, the L-shape bracket, securing plate, and adjustable slide plate are shifted away from the roller. This causes the gap between the adjustable slide plate and roller to increase in size. Accordingly, by adjusting the gap between the roller and the adjustable slide plate provides for a variety of nuts and legumes of various sizes to be shelled by the same apparatus.

As illustrated (see FIG. 2a) the bottom portion of the housing decreases in size and includes an open end. This open end allows for the shells and the meat of the nuts to pass and be routed to the separating area.

The separating area includes a third motor 72, a blower 74, a meat spout 76, and a shell spout 78. The shells and meat enter the shelling area through an entrance 88. Air is blown by the air blower 74. The air blow is activated via the third motor 72. Additionally, the air blower is equipped with a damper 92 to adjust the volume of air that is filtered into the separating area.

The air flow from the air blower is deflective to the vertical shaft (not labeled) of the separating area and is diverted through the cleaning region 80. The magnitude of the air flow will be significant in order to permit for the light weight shells to be carried by the air from the entrance 88 to the cleaning region 80 of the separating area. The enlarge upper region or cleaning region is equipped with exhaust vents 86 parallel to each other. These exhaust vents 86 will allow for the air to escape while providing for the shells to drop under their own weight into the shell spout 78.

The magnitude of the air flow is not high enough for the meat, which is heavier than the shells, to be carried by air due to their weight. Upon passing the entrance 88, the meat falls directly downward and onto a separating screen 90 and into the meat spout 76.

In order to utilize the apparatus of the present invention, the knob of the adjustment means is turned to provide for the desired distance between the roller and the adjustable slide plate so that an accommodation is provided for the desired nuts or legumes to be shelled. Once the desired gap between the adjustable slide plate and the roller is obtained, the first motor having the weight is activated. The second motor controlling the roller is then switched on, to initiate the rotation of the roller. The third motor controlling the blower in then activated.

A specific variety of cracked nuts or legumes are placed in the vibrating hopper. The nuts or legumes are sifted through to the shelling area via the spout located on the hopper. The cracked nuts or legumes either collide with the dehulling plate or come in contact with the bars of the roller. The collision causes an impact between the dehulling plate and the cracked nuts or legumes enabling the pieces of the shells to extract themselves from the meat of the nuts or legumes. After the collision between the dehulling plate with the nuts or legumes, the nuts or legumes fall onto the bars of the roller.

Once the nuts or legumes come in communication with the bars of the roller, the bars force the nuts or legumes upward in order to collide with the dehulling plate. This process of the bars forcing the nuts or legumes upward into the dehulling plate is continued until the shell is completely separated from the meat of the nuts or legumes. Once the shell is completely separated from the seed of the nut or legume, the pieces of the shell and the seed of the nut or legume can slide between the bars of the roller and the adjustable slide plate into the separating area.

The separating area blows air which provides for the pieces of the shells to be carried into the cleaning area and is then diverted to the shell spout.

The seed of the nuts or legumes are much heavier than the shells, and as such, cannot be carried by the air flow. The meat drops directly downward onto the separating plate and into the meat spout.

While the invention has been particularly shown and described with reference to an embodiment thereof, it will be understood by those skilled in the art that various changes in form and detail may be made without departing from the spirit and scope of the invention.

I claim:

1. An apparatus for shelling cracked nuts or legumes and for separating seeds from shells of the cracked nuts or legumes comprising:

a support frame;
   said support frame has a top portion, a middle portion, and a lower portion;
   a hopper for receiving said cracked nuts or legumes;
   said hopper is attached to said top portion of said support frame;
   a first spout;
   said first spout is attached to said hopper;
   a shelling area;
   said shelling area is located in the middle portion of said support frame;
   said shelling area includes a housing;
   said housing includes a top area and a bottom area;
   said housing includes a first opening and a second spout;
   said opening receives said first spout;
   a dehulling plate;
   said dehulling plate is interiorly attached to said top area of said housing;
   a roller is interiorly located in said housing and is tangent to said dehulling plate;
   said roller is provided with a plurality of evenly spaced bars;
   a means is provided for rotating said roller;
   a slide plate is interiorly located in said housing;
   said slide plate is located in the proximity of said roller and is separated from said roller by a gap;
   said gap can be altered by an adjusting means;
   a separating means for separating said seeds from said shells of said nuts or said legumes;
   said separating means is located at said lower portion of said support frame; and
   said second spout is received in said separating means.

2. An apparatus as in claim 1 wherein said separating means further includes an entrance;
   said entrance receives said second spout;
   a blower;
   said blower is located below said entrance;
   a vertical shaft;
   said vertical shaft has a first end, a center, and a second end;
   said first end is attached to said blower;
   a cleaning area;
   said second end of said vertical shaft is attached to said cleaning area;
   a shell spout;
   said shell spout is attached to said cleaning area;
   a seed spout;
   said seed spout is attached to said center of said vertical shaft; and
   said entrance is located above said seed spout.

3. An apparatus as in claim 2 wherein said blower further includes a damper and said cleaning area includes a pair of exhaust vents.

4. An apparatus as in claim 2 wherein said separating means further includes a separating screen and said separating screen is between said entrance and said seed spout.

5. An apparatus as in claim 1 wherein said hopper includes a first motor and a weight is attached to said first motor.

6. An apparatus as in claim 1 wherein a power means rotates said roller;
   said power means includes a second motor;
   said second motor is exteriorly attached to said housing; and a pulley belt is attached to said second motor and to said roller.

7. An apparatus as in claim 1 wherein said adjusting means includes a first elongated threaded rod;

said first elongated threaded rod includes a first end and a second end;

said first end of said first elongated threaded rod is located outside said housing and said second end of said first elongated threaded rod is located inside said housing;

a knob is secured to said first end of said elongated threaded rod;

a L-shaped bracket;

said L-shaped bracket has a first wall and a second wall;

a first aperture is threaded and is located in said first wall;

a second aperture is located in said second wall;

said second end of said elongated threaded rod is received in said first aperture;

a securing plate;

said securing plate has a first end and a second end;

said first end of said securing plate includes a first opening;

said second end of said securing plate includes a second opening;

said first end of said securing plate is attached to said second wall of said L-shape bracket by a first securing means;

said first securing means is received in said second aperture of said L-shape bracket and said first opening of said securing plate;

said adjustable slide plate is attached to said second end of said securing plate;

said slide plate has a top and a bottom;

said top of said slide plate faces said roller;

a second elongated threaded rod;

said second elongated threaded rod has a first end and a second end;

said first end of said second elongated threaded rod extends through said second opening of said second end of said securing plate;

said second elongated threaded rod is maintained to said securing plate by a second securing means; and said second end of said second elongated threaded rod is centrally attached to said bottom of said slide plate.

8. An apparatus as in claim 7 wherein said first securing means is a nut and a bolt.

9. An apparatus as in claim 7 wherein said second securing means is a set collar.

10. An apparatus as in claim 7 wherein said first end of said first elongated threaded rod is maintained exteriorly from said housing by a retaining means;

said retaining means includes a first lock nut and a second lock nut;

said first lock nut is located in proximity to said first end of said first elongated threaded rod and is inside said housing; and said second lock nut is located on said second end of said first end of said first elongated threaded rod and is outside said housing.

* * * * *